Patented Nov. 19, 1946

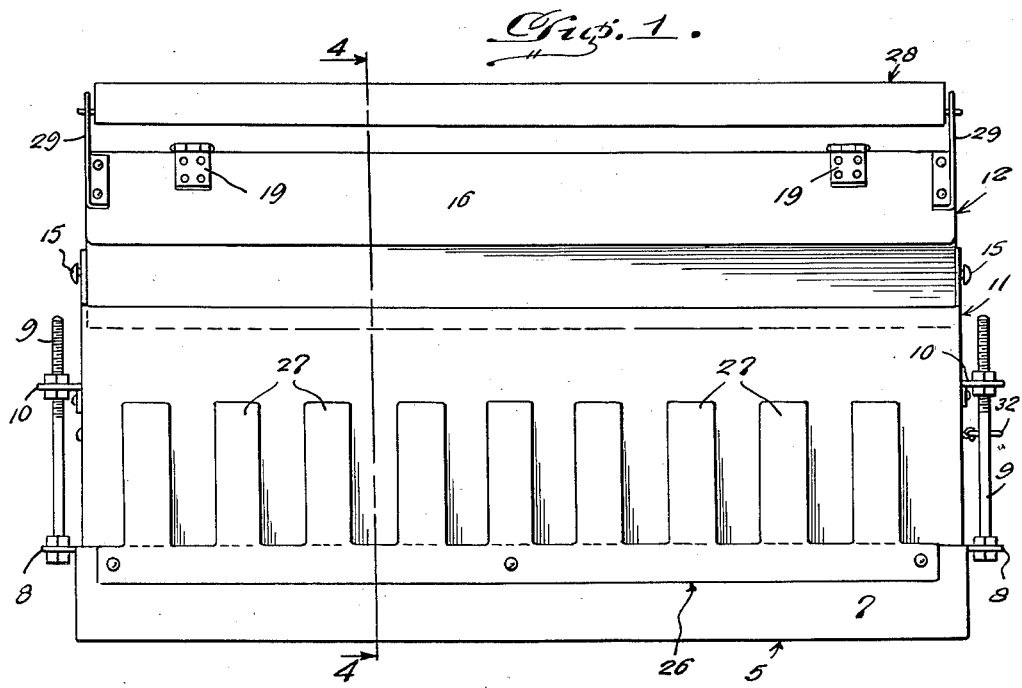
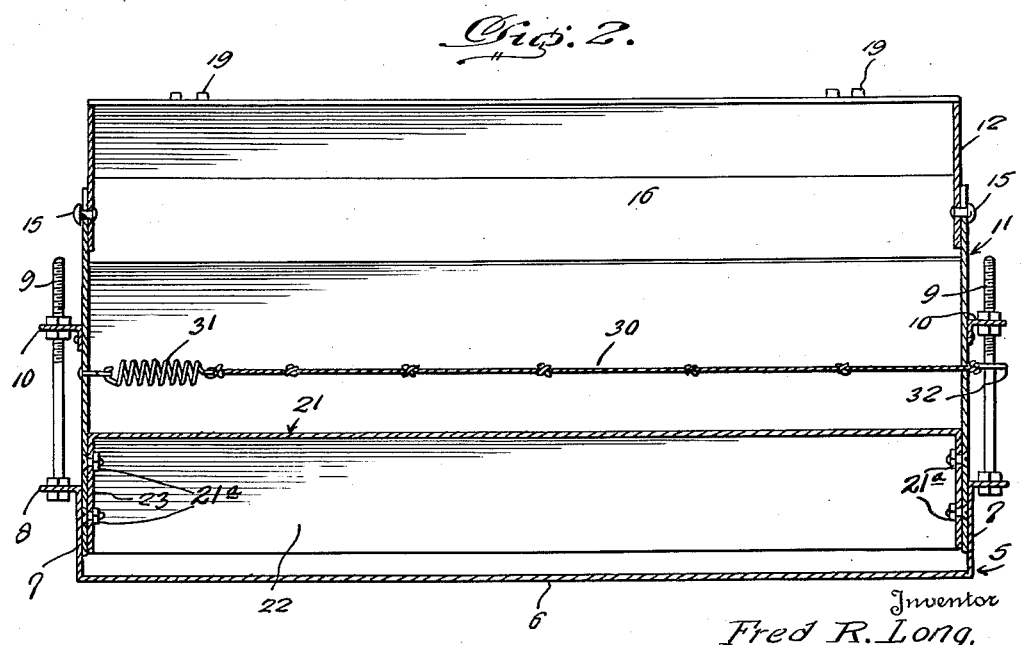

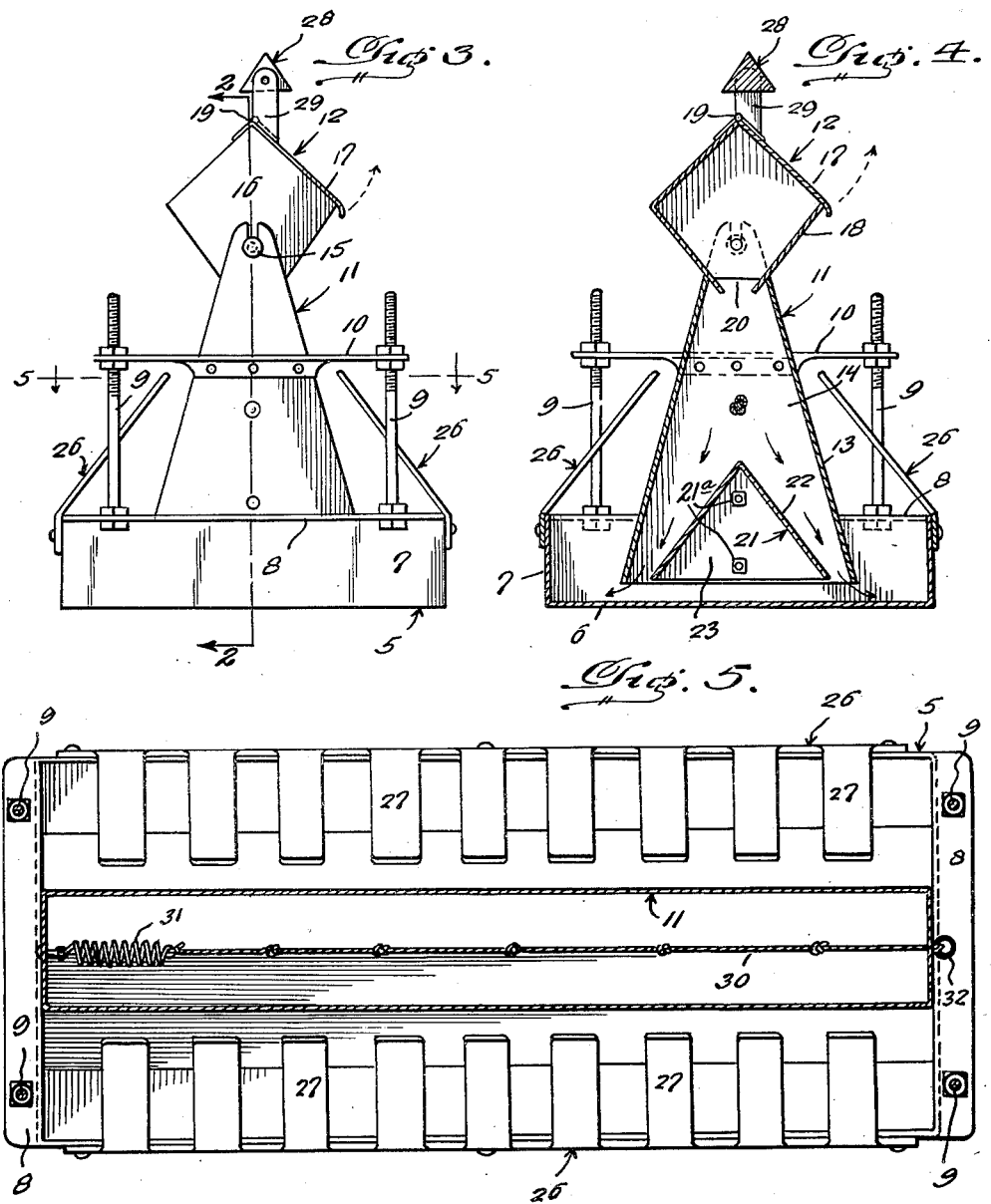

2,411,281

UNITED STATES PATENT OFFICE 2,411,281

POULTRY FEEDER

Fred R. Long, Miamisburg, Ohio

Application February 1, 1944, Serial No. 520,653

2 Claims. (Cl. 119—53)

This invention relates to a poultry feeder and the primary object of the invention is the provision of a device of the stated character which will automatically replenish the feed trough thereof with feed as consumed by the poultry and will provide a maximum amount of protection for the feed and will reduce to a minimum waste of feed by the poultry scattering the feed while eating.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a poultry feeder constructed in accordance with my invention.

Figure 2 is a vertical sectional view taken substantially on a line 2—2 of Figure 3 and showing the interior construction of the feeder.

Figure 3 is an end elevation illustrating the device.

Figure 4 is a transverse sectional view taken substantially on a line 4—4 of Figure 1 and showing how the feed may gravitate from the hopper to the trough as consumed by the poultry.

Figure 5 is a sectional view taken on the line 5—5 of Figure 3.

Referring in detail to the drawings, the numeral 5 indicates a trough preferably of elongated formation and including a bottom wall 6 and upstanding walls 7. The opposite end walls of the trough are equipped with flanges 8 to which are detachably secured vertically arranged threaded rods 9 adjustably connected to arms 10 secured on a chute 11, arranging said chute with the lower edges thereof spaced a selected distance from the bottom wall 6 of the trough so that feed may discharge from the chute fed from a hopper 12 toward opposite side walls and over the bottom wall of the trough. The length of the chute 11 is approximately of the length of the interior of the trough so that the feed will only be discharged over the bottom wall 6 and toward the upstanding side walls 7 of the trough.

The chute 11 includes downwardly sloping side walls 13 and end walls 14 to which the arms 10 are secured. The end walls extend a limited distance above the side walls 13 and are bifurcated to receive headed fasteners 15 secured on opposite end walls 16 of the hopper 12.

The hopper 12 besides having the end walls 16 includes upper and lower pairs of sloping walls 17 and 18. One of the upper walls 17 is hingedly mounted, as shown at 19, so that access to the hopper may be had for the purpose of placing feed therein.

The upper sloping wall 17 of the hopper will readily shed rain and the like, while the lower sloping walls 18 enter the chute and rest on the upper ends of the side walls 13 when the hopper is applied to the chute and coact with each other in forming a restricted throat 20 extending substantially the full length of the hopper and the trough so that as the feed passes from the chute it may flow from the hopper to replenish the chute with feed.

A spreader 21 including diverging walls 22 and end walls 23 is removably mounted in the lower portion of the chute by bolts and nuts 21a and the walls 22 act to direct the feed passing downwardly in the chute toward the side walls of the trough.

To provide adjustment between the arms 10 and the rods 9, the arms 10 are provided with openings to freely receive the screw threaded portions of the rods and are engaged by nuts threaded on said rods. This construction will permit the chute to be raised and lowered with respect to the bottom wall of the trough and permit the chute to be entirely detached from the trough when desired.

Upwardly converging guards 26 are secured to the side walls of the trough and include spaced slats 27 between which the fowls may pass their heads and necks in order to obtain the feed from the trough. The guards 26 prevent fowls from entering and scratching from within the trough as would bring about scattering and waste of feed from the trough.

A poultry anti-roost device 28 is arranged above the hopper to prevent poultry from perching on the latter and consists of a rotatable member of substantially triangular shape in cross section journaled to upstanding brackets 29 secured to the hopper.

The chute 11 is equipped with an agitator so as to dislodge the feed should the latter become stuck and fail to gravitate. The agitator consists of a flexible knotted element 30 equipped at one end with a coil spring 31. The coil spring is connected to one of the end walls of the chute while the other end of the flexible element extends through an opening provided in the other end wall of the chute and has a finger piece 32 connected thereto. By pulling and releasing the finger piece 32, the flexible element may be made to agitate the feed in the chute.

From the foregoing description taken in connection with the accompanying drawings, it will be seen that a very efficient feeder has been provided for various kinds of poultry and that it will supply the trough thereof with feed as long as the hopper and chute contain feed, permitting the poultry to obtain food whenever hungry. The construction of the device is such that the poultry will be prevented from getting into the trough and scattering the feed and thereby bringing about waste thereof. Further, it will be seen that the amount of feed in the trough can be easily regulated by varying the distance between the lower edges of the chute with respect to the bottom wall of the trough. The device can be easily assembled and taken apart when necessary.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a poultry feeder, an elongated trough including upstanding and bottom walls, a chute extending into the trough, means for mounting the chute on the trough for adjustment relative to the latter, a hopper for directing feed into the chute, and an agitator in the chute and comprising a flexible member having longitudinally spaced enlargements, a spring connecting one end of the member to one end of the chute, the other end of the member extending outwardly of an opposite end of the chute, and a pull device attached to said last named end of the member providing means for manually pulling the agitator in one direction, the spring retracting the agitator.

2. In a poultry feeder, an elongated trough including a bottom wall and upstanding walls and end flanges, threaded rods secured to said flanges, a chute extending into the trough and having a length substantially equal to the length of the trough, arms secured to the chute and projecting horizontally outwardly therefrom and adjustably connected to the rods whereby the chute may be raised and lowered with respect to the bottom wall of the trough, said chute having opposite walls thereof of shorter length than other walls of said chute, a hopper extending into the chute and resting on the short walls thereof and including sloping upper and lower walls, means detachably connecting the hopper to the chute, one of said upper inclined walls of the hopper being hingedly mounted to permit opening of the hopper, a deflector arranged in the chute, a flexible element in the chute formed with longitudinally spaced knots and having one end extending exteriorly of the latter and provided with a finger piece providing means for manually moving the element horizontally in the chute in one direction, and a spring connected to the chute and to the other end of the flexible element for retracting the element.

FRED R. LONG.